United States Patent
Moore

(10) Patent No.: US 7,450,469 B2
(45) Date of Patent: Nov. 11, 2008

(54) WATER VELOCITY CORRECTIONS

(75) Inventor: Ian Moore, Trigg (AU)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/437,393

(22) Filed: May 19, 2006

(65) Prior Publication Data

US 2007/0268780 A1 Nov. 22, 2007

(51) Int. Cl.
*G01V 1/00* (2006.01)

(52) U.S. Cl. ...................................................... 367/27

(58) Field of Classification Search ................ 367/27, 367/25; 73/152.01, 152.02
See application file for complete search history.

(56) References Cited

U.S. PATENT DOCUMENTS

| | | | | |
|---|---|---|---|---|
| 4,203,161 A * | 5/1980 | Johnson et al. | ................ | 367/40 |
| 4,460,986 A * | 7/1984 | Millouet et al. | ............... | 367/27 |
| 4,813,027 A * | 3/1989 | Tieman | ....................... | 367/52 |
| 6,160,758 A * | 12/2000 | Spiesberger | ................ | 367/125 |
| 6,205,403 B1 * | 3/2001 | Gaiser et al. | .................. | 702/14 |
| 6,614,717 B1 * | 9/2003 | Khan et al. | .................... | 367/46 |
| 6,751,559 B2 * | 6/2004 | Fookes et al. | ................. | 702/17 |
| 6,757,614 B2 * | 6/2004 | Pepper et al. | ................. | 702/14 |
| 6,885,918 B2 * | 4/2005 | Harmon et al. | ............... | 701/14 |
| 7,010,981 B1 * | 3/2006 | Hull | ............................ | 73/602 |
| 2006/0034151 A1 * | 2/2006 | Iranpour | ..................... | 367/21 |
| 2006/0092764 A1 * | 5/2006 | Robertsson et al. | ........... | 367/14 |
| 2006/0239122 A1 * | 10/2006 | Vigen et al. | ................. | 367/131 |
| 2007/0091719 A1 * | 4/2007 | Falkenberg et al. | ........... | 367/19 |

FOREIGN PATENT DOCUMENTS

| | | | |
|---|---|---|---|
| EP | 851243 A2 * | 7/1998 |
| WO | WO03034093 A1 | 4/2003 |
| WO | WO 2004/109337 A1 | 12/2004 |
| WO | WO2005006021 A1 | 1/2005 |

OTHER PUBLICATIONS

Fried, J. and Mackay, S., 2001, Dynamic corrections for water velocity variations: A Nova Scotia case history: Recorder, 26, No. 10, 5-15.
MacKay, S. and Fried, J., 2002, Removing Distortions Caused by Water Velocity Variations—Method for Dynamic Correction, 64th Mtg.: Eur. Assn. Geosci. Eng., B001.
MacKay, S. and Fried, J., 2003, Removing Distortions Caused by Water Velocity Variations—Method for Dynamic Correction, 65th Mtg.: Eur. Assn. Geosci. Eng., G42.

(Continued)

*Primary Examiner*—Mark Hellner
(74) *Attorney, Agent, or Firm*—Ari Pramudji; Liangang (Mark) Ye; Jeffrey E. Griffin

(57) ABSTRACT

Various technologies for a method for processing seismic data. In one implementation, the method includes cross-correlating seismic traces having midpoint locations, offsets and azimuths within a predetermined range but from different sequences; and selecting a peak on each cross-correlation. Each peak corresponds to a difference in travel times between two seismic traces that were cross-correlated. The method further includes converting the difference in travel times between the two seismic traces to a difference in water velocities between a pair of sequences associated with the two seismic traces at a spatial location.

18 Claims, 4 Drawing Sheets

OTHER PUBLICATIONS

Wombell, R., 1997, Water velocity variations and static corrections in 3D data processing, 59th Mtg.: Eur. Assn. Geosci. Eng., Session:A029.

Wombell, R., 1996, Water velocity variations in 3-D seismic processing, 66th Ann. Internat. Mtg: Soc. of Expl. Geophys., 1666-1669.

MacKay, S. and Fried, J., 2002, Removing distortions caused by water velocity variations: Method for dynamic correction, 72nd Ann. Internat. Mtg: Soc. of Expl. Geophys., 2074-2077.

Fried, J. and MacKay, S., 2002, Removing distortions caused by water velocity variations: Water velocity determination, 72nd Ann. Internat. Mtg: Soc. of Expl. Geophys., 2070-2073.

* cited by examiner

WATER VELOCITY CORRECTIONS

BACKGROUND

1. Field of the Invention

Implementations of various technologies described herein generally relate to marine seismic surveying.

2. Description of the Related Art

The following descriptions and examples are not admitted to be prior art by virtue of their inclusion within this section.

Seismic exploration is widely used to locate and/or to survey subterranean geological formations for hydrocarbon deposits. Since many commercially valuable hydrocarbon deposits are located beneath bodies of water, various types of marine seismic surveys have been developed. In a typical marine seismic survey, such as the exemplary survey conceptually illustrated in FIG. 1, an array 100 of marine seismic streamer cables 105 may be towed behind a survey vessel 110 over a survey area 115. The seismic streamer cables 105 may be several thousand meters long and contain a large number of sensors 125, such as hydrophones, geophones and the like, which are distributed along the length of the each seismic streamer cable 105. The survey vessel 110 may also tow one or more seismic sources 120, such as airguns and the like.

As the array 100 is towed over the survey area 115, acoustic signals or "shots", produced by the seismic sources 120, may be directed down through the water into the earth beneath (not shown), where they are reflected from the various subterranean geological formations. The reflected signals may be received by the sensors 125 in the seismic streamer cables 105, digitized and then transmitted to the survey vessel 110. The digitized signals may be recorded and at least partially processed at the survey vessel 110. The digitized signals may be referred to as "traces". The ultimate aim of this process is to build up a representation of the subterranean geological formations beneath the array 100. Analysis of the representation may indicate probable locations of hydrocarbon deposits in the subterranean geological formations.

Since the area of the array 100 is typically much smaller than the survey area 115, a representation of the earth strata in the survey area 115 may be formed by combining data collected along a plurality of sail lines 130(1-n). For example, a single survey vessel 110 may tow a single array 100 along each of the sail lines 130(1-n). Alternatively, a plurality of survey vessels 110 may tow a plurality of arrays 100 along a corresponding plurality of the sail lines 130(1-n). However, variations in the water conditions, e.g., water temperature, salinity and the like, between the plurality of sail lines 130(1-n) may cause variations in the velocity of sound in water among the sail lines 130(1-n). For example, the variations in seismic wave travel time can be on the order of 10 or 20 milliseconds for traces having a small distance between the source and detector for surveys carried out in deeper waters (greater than 200 m). The variations in seismic wave travel times may shift the temporal position of the various events recorded in the seismic data, including reflections and refractions of the seismic waves from the subterranean geological formations beneath the array 100. Consequently, the variations in the travel times may make it difficult to analyze the combined seismic data set and may reduce the accuracy of the survey.

Moreover, the data for the sail lines 130(1-n) may be collected at different times. As an example, a single pass along one of the sail lines 130(1-n) may take several hours to complete. If a single survey vessel 110 is used, data for the first sail line 130(1) may be recorded at an earlier time than data for the last sail line 130(n). As another example, inclement weather and/or high seas may force a survey to be suspended before resuming hours or days later. As yet another example, historical data from previous surveys performed months or years earlier may be combined with new data to extend the survey or to fill in deficiencies in coverage that may be caused by currents, obstacles, such as platforms, and the like. As still yet another example, data from repeat surveys may be used to analyze and monitor changes in productive oil and/or gas reservoirs.

Combining data from different times and different surveys may exacerbate the aforementioned difficulties associated with variations in the velocity of sound in the water layer. For example, seasonal variations of water temperature, salinity, and the like may cause pronounced variations in the velocity of sound in water. For another example, shifts in water currents may cause unpredictable variations in the velocity of sound in water, particularly for surveys carried out near the edge of strong water currents.

Seismic data may be commonly corrected for variations in the velocity of sound in water by computing one or more so-called "delta t" ($\Delta t$) values, which are typically defined as the difference between an expected travel time, usually based on an assumed ideal water velocity, and a measured travel time for one or more seismic signals. For example, the assumed ideal water velocity may be a constant velocity or one with very smooth spatial changes in velocity.

In one conventional method of determining the delta-t values (described in Wombell, R., 1996, "Water Velocity Variations In 3-D Seismic Processing," 66th Ann. Internat. Mtg: Society of Exploration Geophysicists, Expanded Abstracts, 1666-1669), normal move-out stacking velocities and zero-offset water bottom times are computed along adjacent sail lines. The velocities are then converted to zero offset travel time differences using the formula: $\Delta t = T_w (\Delta V_w / V_w)$, where $\Delta t$ is the difference in two-way travel time at zero offset due to the change in water velocity, $T_w$ is the zero offset water bottom time, $V_w$ is the reference water velocity chosen by the practitioner, and $\Delta V_w$ is the difference between $V_w$ and the computed stacking velocity. The delta-t values are then applied to normal move-out corrected seismic data. One problem with this method is that the velocity analysis must be extremely accurate. Another issue is the effect of water bottom structure on the velocity analysis. If the dip of the water bottom (the angle the water bottom makes with a horizontal plane) changes between or along sail lines, the calculated velocities are strongly affected and may reduce the accuracy of the $\Delta t$ calculation.

Another method of determining the delta-t values that may be used to form combined data sets is described in Fried, J., and MacKay, S., 2001, "Dynamic Corrections For Water Velocity Variations: A Nova Scotia Case History," Canadian Society of Exploration Geophysicists, October 2001 technical luncheon. In this method, normal move-out corrections are applied to pick times with a single velocity. The corrected pick times are then averaged for each combination of sail line, cross line, and common midpoint. The differences between sail line-cross line groups having overlapping midpoints are then evaluated and reduced using an iterative method. The method produces delta-t values that are used to apply a dynamic correction to the seismic data. One difficulty with this method is that the averaged pick times are affected by the difference between the actual normal move-out and the approximate normal move-out applied to correct the pick times. The effect of these differences propagates into the delta-t values. Reducing the offset range of pick times used in the average reduces the differences between the actual normal move-out and the approximate normal move-out applied to correct the pick times. However, reducing the offset range may also reduce the amount of overlapping data upon which the method depends.

SUMMARY

Described herein are implementations of various technologies for a method for processing seismic data. In one implementation, the method includes cross-correlating seismic traces having midpoint locations, offsets and azimuths within a predetermined range but from different sequences; and selecting a peak on each cross-correlation. Each peak corresponds to a difference in travel times between two seismic traces that were cross-correlated. The method further includes converting the difference in travel times between the two seismic traces to a difference in water velocities between a pair of sequences associated with the two seismic traces at a spatial location.

In another implementation, the method includes cross-correlating seismic traces having midpoint locations, offsets and azimuths within a predetermined range but from different sequences and selecting a peak on each cross-correlation. Each peak corresponds to a difference in travel times between two seismic traces that were cross-correlated. The method further includes converting the difference in travel times between the two seismic traces to a difference in water velocities between two sequences associated with the two seismic traces at a spatial location; computing an average of differences in water velocities between the two sequences associated with the two seismic traces within a range of the spatial location; and decomposing the average of differences in water velocities into a difference in water velocities between each sequence and a reference water velocity.

In yet another implementation, the method includes cross-correlating seismic traces having midpoint locations, offsets and azimuths within a predetermined range but from different sequences and selecting a peak on each cross-correlation. Each peak corresponds to a difference in travel times between two seismic traces that were cross-correlated. The method further includes correcting the peak for a difference in offsets between the two seismic traces that were cross-correlated; converting the difference in travel times between the two seismic traces to a difference in water velocities between two sequences associated with the two seismic traces at a spatial location; computing an average of differences in water velocities between the two sequences associated with the two seismic traces within a range of the spatial location; and decomposing the average of differences in water velocities into a difference in water velocities between each sequence and a reference water velocity.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
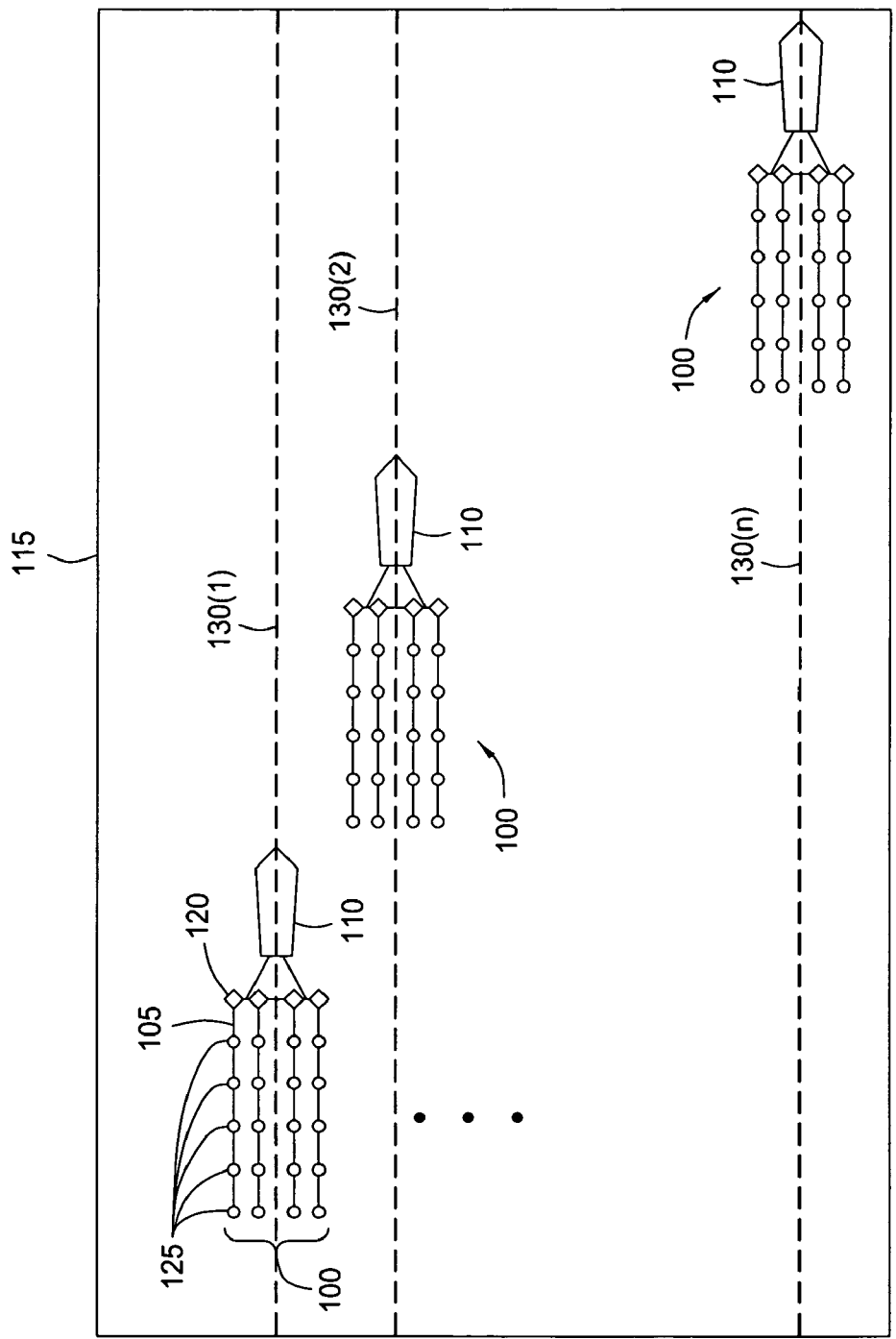
FIG. 1 illustrates a schematic diagram of a prior art marine seismic survey.
Figure 2:
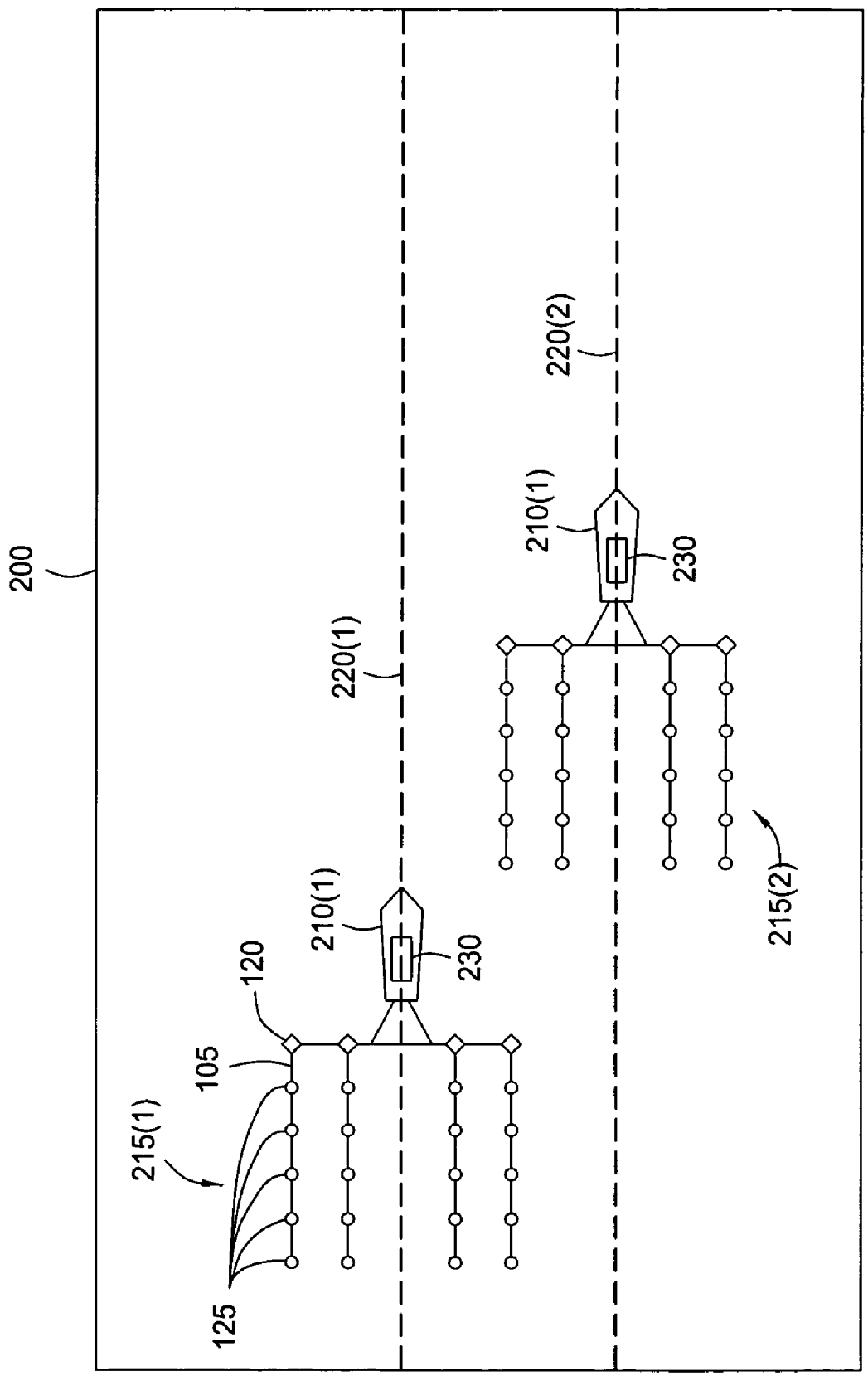
FIG. 2 illustrates a schematic diagram of a marine seismic survey area in which implementations of various technologies described herein may be incorporated and practiced.

FIG. 2 illustrates a schematic diagram of a marine seismic survey area 200 in which implementations of various technologies described herein may be incorporated and practiced. To survey the marine seismic survey area 200, one or more survey vessels 210(1-2) may tow one or more seismic arrays 215(1-2) over the marine seismic survey area 200. While the survey vessels 210(1-2) typically operate on the surface of the sea, the marine seismic survey area 200 refers to a portion of the sea bed. Although implementations of various technologies described herein are with reference to undersea exploration, it should be understood that some implementations may be applied to surveys undertaken in freshwater, brackish water and the like.

The seismic arrays 215(1-2) may include a plurality of seismic sources 120 and seismic sensors 125, such as hydrophones, geophones and the like, which may be coupled to the survey vessel 210(1-2) by cables 105. The plurality of seismic sources 120 and seismic sensors 125 may communicate with a signal processing unit 230 disposed on the survey vessels 210(1-2). In one implementation, the plurality of seismic sources 120 and seismic sensors 125 may communicate with the signal processing unit 230 via the cables 105, which may include wires, fiber-optic cables, and the like. The signal processing unit 230 will be described in more detail with reference to FIG. 3 in the paragraphs below.

The seismic sources 120 and the seismic sensors 125 may be deployed according to various configurations. In one implementation, the seismic sensors 125 may be deployed on the ocean bottom instead of being towed behind the survey vessels 210(1-2). For example, the seismic sensors 125 may be deployed on one or more ocean-bottom cables ("OBC"), which may be disposed on the seafloor. In another implementation, the seismic sources 120 may be deployed on buoys (not shown). In yet another implementation, the seismic sources 120 may be towed by a second vessel (not shown).

The survey vessels 210(1-2) may tow the seismic arrays 215(1-2) along a plurality of sail lines, such as the two sail lines 220(1-2). Although only two sail lines 220(1-2) are shown in FIG. 2, it should be understood that in some implementations surveying the marine seismic survey area 200 may require more than two sail lines 220(1-2). For example, a survey covering an area of 40×70 miles may require about 160 sail lines 220(1-2), with each sail line 220(1-2) capturing about 1300 feet of subsurface coverage perpendicular to the direction of boat travel. Furthermore, although the two sail lines 220(1-2) shown in FIG. 2 are depicted as being approximately adjacent, it should be understood that in some implementations the two sail lines 220(1-2) may not be adjacent or, alternatively, the two sail lines 220 (1-2) may even overlap.

Figure 3:
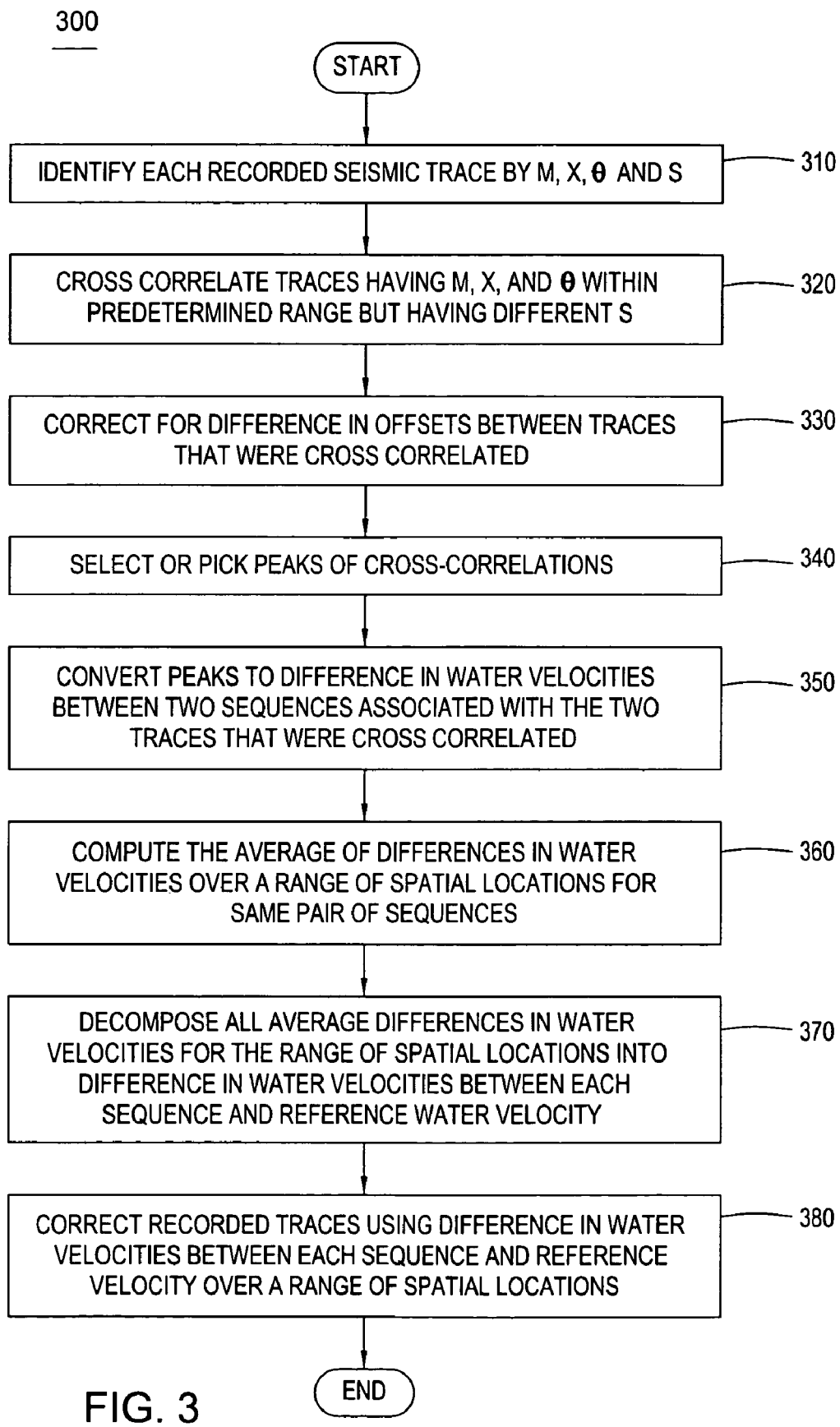
FIG. 3 illustrates a flow diagram of a method for processing seismic data according to implementations of various technologies described herein.

FIG. 3 illustrates a flow diagram of a method 300 for processing seismic data according to implementations of various technologies described herein. As mentioned above, the variations in water velocity may be caused by the variations in the water conditions when the shots were fired during different sequences. In one implementation, method 300 may be directed to determining water velocity variations in seismic data and using the water velocity variations to correct the seismic data. At step 310, each recorded seismic trace may be identified by its midpoint location, m, which represents a midpoint location between the source and receiver for that trace. Each recorded seismic trace may also be identified by its offset between the source and the receiver for that trace. The offset may commonly be represented as x. Each trace may further be identified by its azimuth, which is the angle between a line connecting the source and the receiver for that trace and some fixed direction. The azimuth may commonly be represented by the symbol $\ominus$. Each trace may further be identified by its sequence number or sail line number, which may commonly be represented with the letter S. Each trace may further be associated with a reference water bottom time, $t_{ref}$. For a given trace, the reference water bottom time may be defined as the time taken for the wave to travel from the source to the receiver via a reflection at the water bottom. In one implementation, a portion of the traces may be modeled traces. Modeled traces may be defined as traces that were not physically recorded but were generated either from recorded traces or from a geological model.

At step 320, traces having midpoint locations, offsets and azimuths within a predetermined range but having different sequence numbers may be cross-correlated to generate cross-correlations. In one implementation, the traces may be cross-correlated over a window containing water bottom reflections. The window refers to a short section of the trace that primarily relates to the water bottom. The start and end times of the window may be determined using the reference water bottom time $t_{ref}$.

At step 330, the cross-correlations may be corrected for the difference in offsets between the traces that were cross-correlated. In one implementation, the cross-correlations may be corrected using a differential moveout algorithm. In one implementation, the cross-correlations may be corrected using a differential normal moveout (NMO) algorithm.

At step 340, the peaks of the cross-correlations may be picked or selected. Each peak may correspond to a difference in travel times between two traces that were cross-correlated at a spatial location, which corresponds to the midpoint locations of the two traces. This difference in travel times may be referred to as tau. Although the difference in travel times may be determined by selecting a peak of the cross-correlation, it should be understood that in some implementations the difference in travel times may be determined by selecting other portions of the cross-correlation.

In one implementation, a quality factor may be assigned to each peak or tau. The quality factor may be based on the waveform of the cross-correlation. More specifically, the quality factor may be based on the similarity between the waveform of the cross-correlation and an ideal waveform. The ideal waveform may be estimated as the autocorrelation of an acquisition wavelet. The acquisition wavelet may be estimated by modeling or may be derived from the water bottom reflection. The more similar the waveform of the cross-correlation to the ideal waveform, the higher the quality factor. The quality factor may also be based on the similarity of the midpoint locations, offsets and azimuths between the traces that Were cross-correlated. The more similar the midpoint locations, offsets and azimuths between the traces that were cross-correlated, the higher the quality factor. In some implementations, the peaks may first be selected and subsequently corrected for a difference in offsets.

At step 350, each peak or tau, which corresponds to the difference in travel times between the two traces that were cross-correlated, may be converted to the difference in water velocities between the two sequences associated with the two traces that were cross-correlated at the spatial location of the cross-correlation. The difference in water velocities may be referred to as dv. In one implementation, the difference in water velocities dv may be determined using the formula tau/t=dv/v, where t may be the reference water bottom time $t_{ref}$ and v may be the reference water velocity $v_{ref}$ at the spatial location of the cross-correlation. Alternatively, v may be the average water velocity over a region of the spatial location.

At step 360, the differences in water velocities (i.e., dv's) over a range of spatial locations for the same pair of sequences are averaged or smoothed. In this manner, an average difference in water velocities (i.e., $dv_{ave}$) may be associated for the range of spatial locations for the pair of sequences. For each range of spatial locations, there may be several average differences in water velocities for different pairs of sequences. In one implementation, the variance of the difference in water velocities may be used as a quality factor for the average difference in water velocities. The smaller the variance, the higher the quality factor.

At step 370, all the average differences in water velocities (i.e., $dv_{ave}$) for the range of spatial locations may be decomposed into a difference in water velocities between each sequence and the reference water velocity, i.e., $dv_{ref}$. In one implementation decomposition may be based on a system of linear equations. In another implementation, the system of linear equations may be solved using least-squares algorithms. In still another implementation, the equations may be weighted by the quality factors. In still yet another implementation, an additional set of equations may be included to guide the solution towards a previous solution, when such a solution is available.

At step 380, the difference in water velocities between each sequence and the reference water velocity over the range of spatial locations (i.e., $dv_{ref}$) may be used to correct the recorded traces. In one implementation, each trace corresponding to a range of spatial locations at a given sequence may be corrected by a time shift, dt, which may be determined using the equation $dt=(dv_{ref}/v_{ref})t_{ref}$. The correction algorithm may be described in more detail in commonly assigned U.S. Pat. No. 6,799,118, which is incorporated herein by reference. In this manner, the water bottom travel times of the recorded traces may be corrected to the times the traces would have been recorded if the water velocity were at a constant reference water velocity at the time the traces were acquired.

The following paragraphs provide the theory that supports implementations of various techniques described herein. Water velocity, v, is assumed to be a function of sequence number, S, and spatial location, x. In one implementation, recorded seismic traces may be corrected to simulate seismic traces that would have been recorded if the water velocity were equal to a reference water velocity, $v_{ref}$, which may represent an average over the water layer.

Suppose the recorded seismic traces corresponding to the reference water velocity are given by:

$$d_r(t)=w*R(t) \qquad (1),$$

where w is the effective wavelet (source signature, instrument filters, etc), R is the earth's response as a function of time defined by the reference velocity, and the asterisk denotes convolution.

The recorded seismic traces corresponding to scaling the entire velocity field by a constant factor $v/v_r$ (such that the water velocity becomes v) may be given by $$d(t)=w*R(tv/v_r)=w*R(t\{1+\Delta v/v_r\}) \quad (2),$$

where $\Delta v=v-v_r$ is the velocity difference. Notably, the response, R, is stretched in time, but the wavelet is not.

A window of recorded data may be centered on a reference time, $t_r$, such that the window contains predominantly events whose raypaths lie in the water layer (i.e., whose travel times are affected only by the water velocity). Refracted arrivals may be avoided since they depend on the sediment velocity. Within this window, the recorded seismic trace may be given by d(t), which can be approximated as $$d(t) \approx w*R(t+\Delta t)=d_r(t+\Delta t) \quad (3),$$

where $\Delta t = t_r \Delta v/v_r$ is the time difference between the recorded and reference traces. Notably, equation (3) makes no assumptions about the complexity of the water bottom, and is not sensitive to the value of $t_r$.

Similarly, if there are two collocated traces, $d_i(t)$ and $d_j(t)$, then the time difference between them is $$\Delta t_{ij}=t_r(\Delta v_i - \Delta v_j)/v_r \quad (4),$$

or, equivalently, $$\Delta T_{ij}=\Delta V_i - \Delta V_j \quad (5),$$

where $T=t/t_r$ and $V=v/v_r$ are the dimensionless time and velocity, respectively.

The travel time differences, $\Delta T_{ij}$, may be obtained from cross-correlations of the two traces. Picking the peaks of the cross-correlations may be easier than picking the water bottom reflections, since the cross-correlations can be expected to contain a band-limited spike regardless of complexity, provided the traces are collocated and the window is selected appropriately.

At a given spatial location, $\Delta V_i$ may depend only on the sequence number. If $n_c$ independent cross-correlation picks covering $n_s$ sequences are given, then it is possible to invert equation (5) for the velocity differences, $\Delta V_i$, provided $n_c \geq n_s$. In this context, independent means that no pick can be inferred by combining other picks. Notably, the inversion may only be possible up to an additive constant, as will be described in the following paragraphs. At a given location, the system of equations (5), may be written as:

$$\Delta T_c = \Delta V_{S1(c)} - \Delta V_{S2(c)} \quad (6),$$

where c indexes the cross-correlation pick, and S1(c) and S2(c) are the two sequences involved. In matrix notation, equation (6) may be represented as:

$$M\Delta V = \Delta T \quad (7),$$

where M is an $n_c$ by $n_s$ matrix defined by $$m_{cs}=\delta(S1(c),S(s))-\delta(S2(c),S(s)) \quad (8),$$

where S(s) is the sequence number associated with column s and represents an arbitrary mapping from the set of integers 1, 2, ..., $n_s$ to the sequence numbers. The delta function, $\delta$, takes the value 1 if its arguments are equal and zero otherwise. $\Delta V$ is an (unknown) $n_s$-vector of the velocity differences for each sequence, and $\Delta T$ is a (known) $n_c$-vector of the cross-correlation picks.

Equation (7) may be solved (in the least-squares sense) using conjugate gradient techniques. Since M is sparse (only two non-zero elements per row), sparse matrix algebra may also be used to improve performance and reduce storage requirements. If each pick is associated with a quality measure (variance), then the rows of equation (7) may be scaled by these quality measures in order to increase the relative contribution of good picks compared to bad picks in obtaining the solution.

The following paragraphs describe several issues regarding various implementations described herein. In one implementation, multiple picks may be selected for a single sequence pair at a given location. Theoretically, these picks should all be the same. The simplest approach may be to insert all of the picks into the matrix, M, and allow the inversion to reconcile them as far as possible. However, this may produce a very large system of equations. An alternative may be to combine (average) all the picks for a given sequence pair into a single pick. The variance of the picks may be converted into a quality measure for the combined pick. Notably, the dimensionless picks, $\Delta T$, may depend only on the velocity difference and may therefore be averaged across offsets. The raw picks, $\Delta t$, may depend quite strongly on offset through the travel time, tr, and therefore cannot be averaged.

As mentioned above, the solution to equation (7) may only be determined up to an additive constant, because adding a constant to $\Delta V$ does not alter $M\Delta V$. Determination of the absolute velocities may require velocity analysis, which cannot easily be achieved from the cross-correlations alone. Generally, a solution with a small $\Delta V$ is desirable. This may be provided automatically by the conjugate gradient algorithm if the initial model is zero. If alternative constraints on $\Delta V$ are available, e.g., specifying the velocity for a specific sequence or matching a previous solution, then this can easily be achieved either by adjusting the computed $\Delta V$ or by incorporating the constraint into the system (7).

Generally, real datasets do not contain perfectly collocated traces. In practice, it may be necessary to cross-correlate traces with (small) differences in midpoint, offset and azimuth. The cross-correlation picks may be adjusted to some extent for differences in travel time, resulting from differences in offset using a moveout equation. Since the effect of differences in midpoint, offset and azimuth is effectively random, these differences may be ignored provided they are not so large that the cross-correlations cannot be picked and provided there are enough picks that the random variations average out in the solution. However, it may be necessary to minimize the differences in selecting the cross-correlations.

In order to provide a solution for a given sequence, the sequence may need to overlap other sequences such that all the sequences are coupled. This may be achieved by allowing sufficient difference in location between traces being correlated. Selection of the traces to correlate may itself be an optimization problem. A simple method for selecting cross-correlations may be described in the paragraphs below.

The velocity differences, $\Delta V$, may likely to have some (slow) dependence on spatial location. This is almost entirely through the inline coordinate, since each sequence has limited crossline extent. The simplest way to address this inline dependence is to solve independent systems of equations at a variety of inline locations, and then to interpolate the solution to intermediate locations. A better method may be to provide picks over a continuum of inline locations and to solve for a space-variant $\Delta V$ subject to suitable constraints on the rate of spatial variation. However, this may make the system considerably more complex.

Real data generally contain noise that may not be repeated from sequence to sequence and that may create differences between collocated traces which are not due to differences in water velocity. This noise may distort the cross-correlations. Apart from pre-processing to remove noise, the simplest way to handle this distortion may be to estimate a quality measure for each cross-correlation pick, based on the cross-correlation itself. Ideally, the cross-correlation will be a zero-phase, band-limited spike with spectrum equal to the square of the spectrum of the wavelet. The similarity of the actual cross-correlation to the ideal gives a quality measure, which can be used in the inversion.

The following paragraphs are directed to matching a solution with a previous solution. Ideally, cross-correlations should be computed for the entire survey and decomposed in a single step. However, this is often unlikely to be practical because of the need to begin 3D processing (such as progressive migration) before the entire survey is available. In general, it is envisioned that the survey may be acquired in patches such that each patch (consisting of prime coverage and infill) may be completely acquired before the acquisition effort moves to the next patch. There may be some overlap between patches. Accordingly, it may be desirable to perform the decomposition patch by patch, with the solution for each being made consistent with that for previous patches. In general, the solution for previous patches cannot be updated, because the corresponding data may already have been processed based on that solution.

Suppose $\Delta V_1$ is a solution for a set of sequences, $S_1$, corresponding to previously processed patches. The decomposition for sequences near the edge of the patch may be poor because of insufficient overlap. Consequently, these sequences may not be processed further until the adjacent patch is available and the solution is better constrained. Assume $S_1$ contains only sequences for which the solution is considered good and for which the solution therefore cannot be updated. Suppose the new patch contains a set of sequences $S_2 = S_{new} \cup S_{prev}$, where $S_{new}$ is the set of new sequences for the desired solution, and $S_{prev}$ is the set of $n_{prev}$ existing sequences for which a solution has already been obtained and which overlap the sequences in $S_{new}$. $S_{new}$ may contain both newly acquired data and data which have been used in a previous decomposition but for which the solution was not considered good. In order to guide the solution for the new patch towards that for the previous patches, equation (7) may be augmented to $$\begin{pmatrix} M \\ wD \end{pmatrix} \Delta V_2 = \begin{pmatrix} \Delta T_2 \\ w \Delta V_{prev} \end{pmatrix}, \quad (9)$$

where D is an $n_{prev}$ by $n_s$ matrix with each row corresponding to a sequence in $S_{prev}$ and containing all zeros except for a 1 in the column corresponding to the sequence. $\Delta V_{prev}$ is an $n_{prev}$-vector containing the previous solution, and w is a weight which dictates the relative importance of matching the previous solution compared to honoring the picks, $\Delta T_2$.

Equation (9) may be solved using the same algorithm as equation (7). The part of $\Delta V_2$ corresponding to $S_{new}$ may then give the desired result, and the part corresponding to $S_{prev}$ may be compared to the previous solution for these sequences as a qc.

Figure 4:
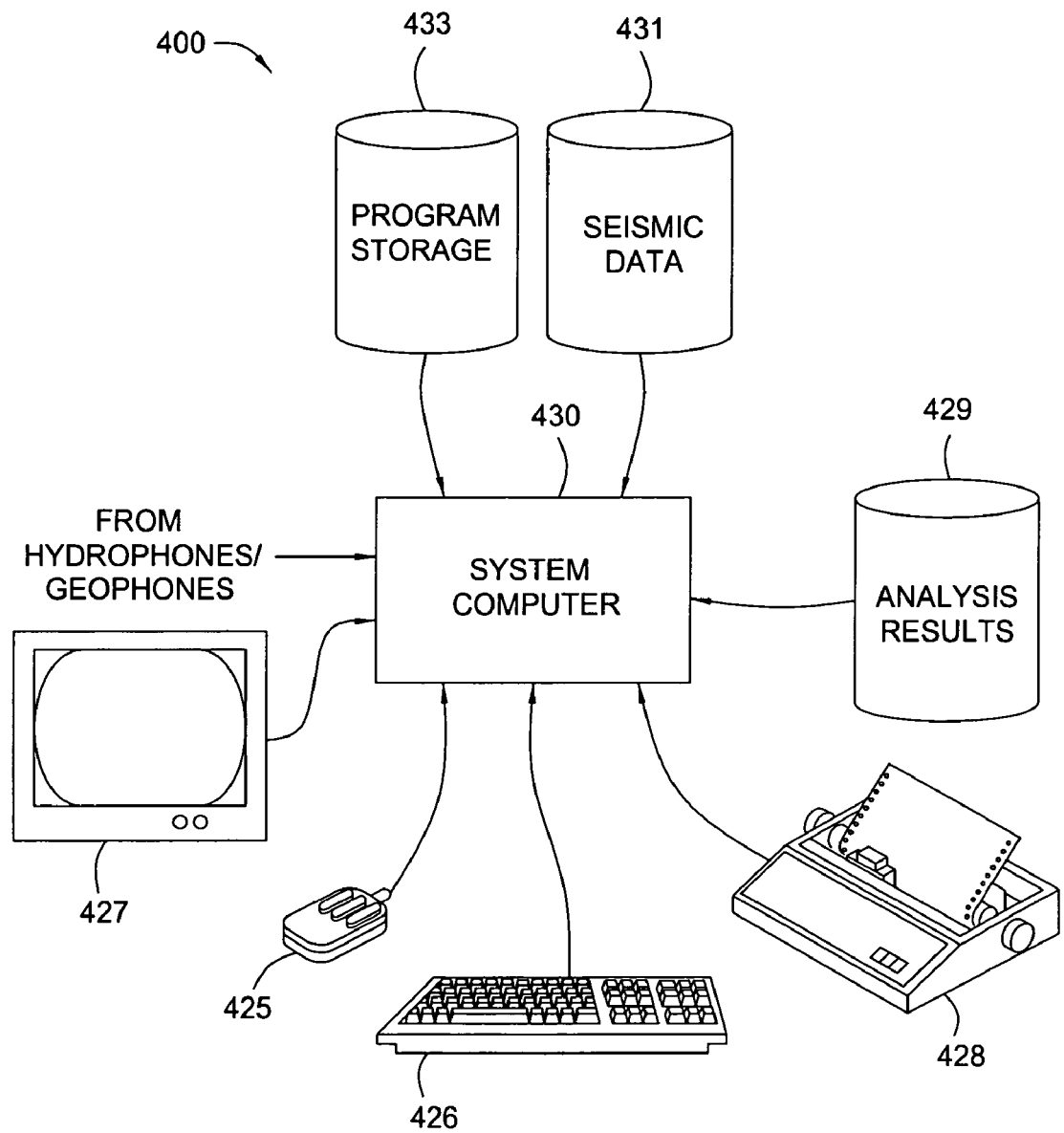
FIG. 4 illustrates a computer network, into which implementations of various technologies described herein may be implemented.

FIG. 4 illustrates a computer network 400, into which implementations of various technologies described herein may be implemented. The computer network 400 may include a system computer 430, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the receivers may be stored in disk storage device 431. The system computer 430 may retrieve the appropriate data from the disk storage device 431 to process seismic data according to program instructions that correspond to implementations of various technologies described herein. The program instructions may be written in a computer programming language, such as C++, Java and the like. The program instructions may be stored in a computer-readable medium, such as program disk storage device 433. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427, or alternatively via printer 428. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. These signals, after conventional formatting and other initial processing, may be stored by the system computer 430 as digital data in the disk storage 431 for subsequent retrieval and processing in the manner described above. While FIG. 4 illustrates the disk storage 431 as directly connected to the system computer 430, it is also contemplated that the disk storage device 431 may be accessible through a local area network or by remote access.

Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
    cross-correlating seismic traces having midpoint locations, offsets and azimuths within a predetermined range but from different sequences;
    selecting a peak on each cross-correlation, wherein each peak corresponds to a difference in travel times between two seismic traces that were cross-correlated; and
    converting the difference in travel times between the two seismic traces to a difference in water velocities between a pair of sequences associated with the two seismic traces at a spatial location using the formula $tau/t=dv/v$, where tau represents the difference in travel times between the two seismic traces, t represents a reference water bottom time, dv represents the difference in water velocities and v represents a reference water velocity at the spatial location.

2. The method of claim 1, further comprising decomposing the difference in water velocities between the pair of sequences into a difference in water velocities between each sequence in the pair of sequences and a reference water velocity.

3. The method of claim 2, wherein the difference in water velocities between the pair of sequences is decomposed using a system of linear equations.

4. The method of claim 2, further comprising correcting the seismic traces using the difference in water velocities between each sequence and the reference water velocity.

5. The method of claim 4, wherein correcting the seismic traces comprises determining a time shift that corresponds to the difference in water velocities between each sequence and the reference water velocity.

6. The method of claim 5, further comprising correcting the seismic traces using the time shift.

7. The method of claim 1, further comprising smoothing a set of differences in water velocities over a range of spatial locations for each pair of sequences.

8. The method of claim 1, further comprising computing an average of differences in water velocities over a range of spatial locations for each pair of sequences.

9. The method of claim 8, further comprising decomposing the average of differences in water velocities into a difference in water velocities between each sequence in the pair of sequences and a reference water velocity.

10. The method of claim 9, further comprising correcting the seismic traces using the difference in water velocities between each sequence and the reference water velocity.

11. The method of claim 1, wherein the seismic traces are cross-correlated over a window containing water bottom reflections.

12. The method of claim 1, further comprising correcting the cross-correlations for a difference in offsets between the two seismic traces that were cross-correlated.

13. The method of claim 12, wherein the cross-correlations are corrected for the difference in offsets using a differential moveout algorithm.

14. A method for processing seismic data, comprising:
    cross-correlating seismic traces having midpoint locations, offsets and azimuths within a predetermined range but from different sequences;
    selecting a peak on each cross-correlation, wherein each peak corresponds to a difference in travel times between two seismic traces that were cross-correlated;
    converting the difference in travel times between the two seismic traces to a difference in water velocities between two sequences associated with the two seismic traces at a spatial location using the formula $tau/t=dv/v$, where tau represents the difference in travel times between the two seismic traces, t represents a reference water bottom time, dv represents the difference in water velocities and v represents a reference water velocity at the spatial location;
    computing an average of differences in water velocities between the two sequences associated with the two seismic traces within a range of the spatial location; and
    decomposing the average of differences in water velocities into a difference in water velocities between each sequence and a reference water velocity.

15. The method of claim 14, further comprising correcting a portion of the seismic traces using the difference in water velocities between each sequence and the reference water velocity.

16. A method for processing seismic data, comprising:
    cross-correlating seismic traces having midpoint locations, offsets and azimuths within a predetermined range but from different sequences;
    selecting a peak on each cross-correlation, wherein each peak corresponds to a difference in travel times between two seismic traces that were cross-correlated;
    correcting the peak for a difference in offsets between the two seismic traces that were cross-correlated;
    converting the difference in travel times between the two seismic traces to a difference in water velocities between two sequences associated with the two seismic traces at a spatial location using the formula $tau/t=dv/v$, where tau represents the difference in travel times between the two seismic traces, t represents a reference water bottom time, dv represents the difference in water velocities and v represents a reference water velocity at the spatial location;
    computing an average of differences in water velocities between the two sequences associated with the two seismic traces within a range of the spatial location; and
    decomposing the average of differences in water velocities into a difference in water velocities between each sequence and a reference water velocity.

17. The method of claim 16, further comprising correcting a portion of the seismic traces using the difference in water velocities between each sequence and the reference water velocity.

18. The method of claim 16, wherein the seismic traces are cross-correlated over a window containing water bottom reflections.

* * * * *